(12) United States Patent
Kern et al.

(10) Patent No.: US 9,286,586 B2
(45) Date of Patent: *Mar. 15, 2016

(54) INFORMATION GOVERNANCE CROWD SOURCING

(71) Applicant: International Business Machines Corporation, Armonk, NY (US)

(72) Inventors: Robert Kern, Boeblingen (DE); Dan J. Mandelstein, Austin, TX (US); Ivan M. Milman, Austin, TX (US); Martin A. Oberhofer, Bondorf (DE); Sushain Pandit, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/886,760

(22) Filed: May 3, 2013

(65) Prior Publication Data

US 2013/0275170 A1   Oct. 17, 2013

Related U.S. Application Data

(63) Continuation of application No. 13/446,681, filed on Apr. 13, 2012.

(51) Int. Cl.
  *G06F 11/00* (2006.01)
  *G06Q 10/06* (2012.01)
  *G06F 17/28* (2006.01)
  *G06F 17/27* (2006.01)

(52) U.S. Cl.
  CPC ........ *G06Q 10/063112* (2013.01); *G06F 17/27* (2013.01); *G06F 17/2854* (2013.01); *G06Q 10/06398* (2013.01)

(58) Field of Classification Search
  CPC ............... G06Q 10/063112; G06Q 10/0639; G06Q 10/06393; G06Q 10/06395; G06Q 10/06398; G06Q 10/01; G06F 17/27; G06F 17/2725; G06F 17/273; G06F 17/274; G06F 17/277; G06F 17/2775; G06F 17/2785; G06F 17/2854
  USPC .......... 714/26; 705/7.14; 379/265.06, 265.12; 715/751
  See application file for complete search history.

(56) References Cited

U.S. PATENT DOCUMENTS

| 8,160,324 | B2* | 4/2012 | Fischer et al. | 382/128 |
|---|---|---|---|---|
| 8,543,582 | B1* | 9/2013 | Granstrom | 707/748 |
| 8,553,930 | B1* | 10/2013 | Myers | 382/100 |

(Continued)

OTHER PUBLICATIONS

Bermbach, David et al., An Extendable Toolkit for Managing Quality of Human-based Electronic Services, Workshops at the Twenty-Fifth AAAI Conference on Artificial Intelligence, Aug. 2011, AAAI Publications, Palo Alto, CA, United States.

(Continued)

*Primary Examiner* — Marc Duncan
(74) *Attorney, Agent, or Firm* — Patterson & Sheridan, LLP

(57) ABSTRACT

A method, computer program product, and system for information governance crowd sourcing by, responsive to receiving a data quality exception identifying one or more data quality errors in a data store, identifying a performance level required to correct the data quality errors, selecting, from a crowd hierarchy, a first one or more crowds meeting the defined performance level, wherein the crowd hierarchy ranks the performance of one or more crowds, and routing, by operation of one or more computer processors, the one or more data quality errors to the selected crowds for correction.

8 Claims, 7 Drawing Sheets

(56) References Cited

U.S. PATENT DOCUMENTS

| | | | |
|---|---|---|---|
| 8,594,306 B2* | 11/2013 | Laredo et al. | 379/265.11 |
| 8,626,545 B2* | 1/2014 | Van Pelt et al. | 705/7.13 |
| 2005/0165854 A1 | 7/2005 | Burnett et al. | |
| 2006/0224510 A1* | 10/2006 | Walker et al. | 705/40 |
| 2006/0247949 A1* | 11/2006 | Shorrosh | 705/2 |
| 2008/0114644 A1* | 5/2008 | Frank et al. | 705/14 |
| 2009/0198487 A1* | 8/2009 | Wong et al. | 704/4 |
| 2009/0259526 A1* | 10/2009 | Bechtel et al. | 705/10 |
| 2010/0235408 A1* | 9/2010 | Nichols et al. | 707/805 |
| 2011/0137855 A1* | 6/2011 | Shustef | 707/609 |
| 2011/0145156 A1* | 6/2011 | Feng et al. | 705/301 |
| 2011/0173214 A1* | 7/2011 | Karim | 707/754 |
| 2011/0208684 A1 | 8/2011 | Dube et al. | |
| 2011/0282793 A1* | 11/2011 | Mercuri et al. | 705/80 |
| 2011/0313757 A1* | 12/2011 | Hoover et al. | 704/9 |
| 2011/0313801 A1* | 12/2011 | Biewald et al. | 705/7.12 |
| 2012/0029978 A1* | 2/2012 | Olding et al. | 705/7.42 |
| 2012/0117163 A1* | 5/2012 | Lester et al. | 709/206 |
| 2012/0150579 A1* | 6/2012 | De Wit | 705/7.14 |
| 2012/0150820 A1* | 6/2012 | Sankaranarayanan et al. | 707/690 |
| 2012/0151278 A1* | 6/2012 | Tsantilis | 714/48 |
| 2012/0265573 A1* | 10/2012 | Van Pelt et al. | 705/7.14 |
| 2013/0055042 A1* | 2/2013 | Al Za'noun et al. | 714/746 |
| 2013/0159040 A1* | 6/2013 | Sarmenta et al. | 705/7.15 |
| 2013/0159804 A1* | 6/2013 | Suzue et al. | 714/746 |
| 2013/0231969 A1* | 9/2013 | Van Pelt et al. | 705/7.13 |
| 2013/0253969 A1* | 9/2013 | Das et al. | 705/7.13 |
| 2013/0311219 A1* | 11/2013 | Green | 705/7.14 |
| 2014/0172417 A1* | 6/2014 | Monk et al. | 704/9 |
| 2014/0195312 A1* | 7/2014 | Ansel et al. | 705/7.42 |
| 2014/0324968 A1* | 10/2014 | D'Amore et al. | 709/204 |

OTHER PUBLICATIONS

Howe, Jeff, The Rise of Crowdsourcing, Wired, Jun. 2006, Issue 14.06, <http://www.wired.com/wired/archive/14.06/crowds.html>.

Kern, Robert et al., Managing Quality of Human-Based eServices, LNCS: Lecture Notes in Computer Science, 2009, pp. 304-309, Springer-Verlag, Berlin, Heidelberg, Germany.

Howe, Jeff, Crowdsourcing: Why the Power of the Crowd Is Driving the Future of Business, 2008, p. 6, Three Rivers Press, New York, New York, United States.

Law, Edith et al., Human Computation (Synthesis Lectures on Artificial Intelligence and Machine Learning), 2011, p. 4, Morgan & Claypool Publishers, San Rafael, California, United States.

U.S. Appl. No. 13/446,681, entitled Information Governance Crowd Sourcing, filed Apr. 13, 2012.

* cited by examiner

INFORMATION GOVERNANCE CROWD SOURCING

CROSS-REFERENCE TO RELATED APPLICATIONS

This application is a continuation of co-pending U.S. patent application Ser. No. 13/446,681, filed Apr. 13, 2012. The aforementioned related patent application is herein incorporated by reference in its entirety.

BACKGROUND

Embodiments described herein relate generally to the field of computer software. In particular, embodiments described herein relate to information governance crowd sourcing.

The quality of information assets is a core concern of most modern enterprises. In many cases, information quality has become a key aspect of projects such as data warehousing and application system consolidation. In other cases, it is the main driving force for establishing master data management projects, which aim to create and maintain master data (i.e., customer, supplier, product, employee, account data) at its core. Since these master data entities are critical to all major business processes, the projects strive to maintain premium information quality metrics for the entire enterprise life cycle.

Information quality has multiple metrics, which include, but are not limited to: spelling errors, missing data, duplicate data, incorrect values, inconsistent format, incomplete format, syntax violations, violations of integrity constraints, text formatting, synonyms, and homonyms. An error related to any of these metrics requires human intervention for a resolution, yet current methods fail to optimize human resources for completing these tasks.

SUMMARY

Embodiments provide a method, product, and system for performing an operation for information governance crowd sourcing by, responsive to receiving a data quality exception identifying one or more data quality errors in a data store, identifying a performance level required to correct the data quality errors, selecting, from a crowd hierarchy, a first one or more crowds meeting the defined performance level, wherein the crowd hierarchy ranks the performance of one or more crowds, and routing, by operation of one or more computer processors, the one or more data quality errors to the selected crowds for correction.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
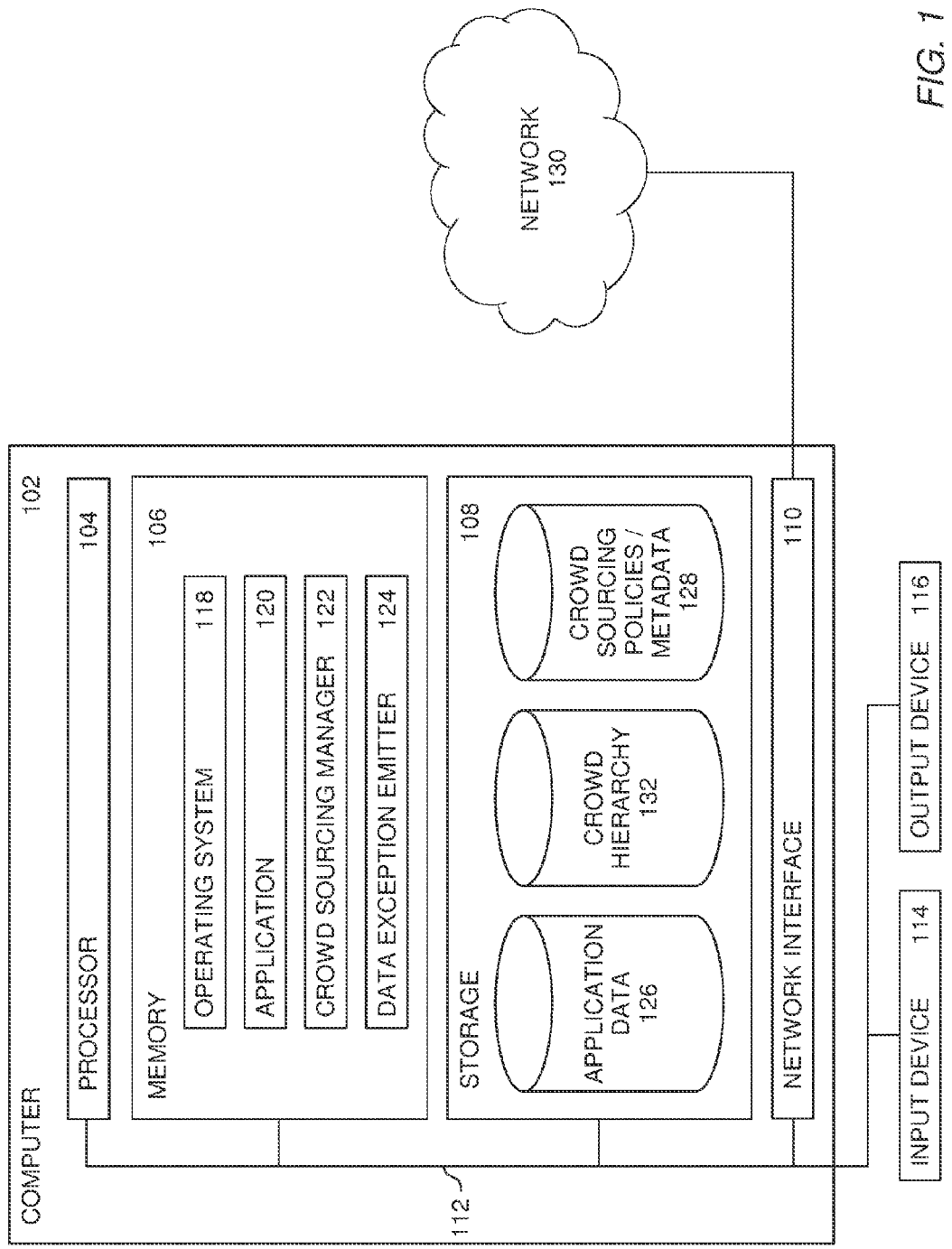
FIG. 1 is a block diagram illustrating a system for emitting exceptions responsive to data quality errors and forwarding the data quality errors to a crowd in a crowd sourcing environment for correction, according to one embodiment described herein.

Embodiments described herein provide techniques for, responsive to data quality errors in an information system, forwarding the data quality errors to crowds in a crowd sourcing environment for correction. In some embodiments, an application is provided to perform the operations disclosed herein. In some embodiments, the application detects one or more data quality errors. In other embodiments, a user may manually detect and submit data quality errors to the application. Responsive to the data quality error, the application may then identify a performance level required to correct the data quality errors based on the type of error and the privacy level of the data. The application may then select one or more crowds meeting the performance level from a crowd hierarchy, wherein the crowd hierarchy ranks the performance of one or more crowds. The application may then route the data quality errors to the selected crowds for correction. Finally, the application may then compute a wage for the crowds for correcting the one or more data quality errors.

Paid crowd sourcing extends the cloud computing paradigm to human resources by providing human workforce as a scalable resource remotely over a web platform. Such a configuration provides a powerful way of outsourcing "microtasks" to large groups of people over the Internet in order to increase the productivity of business processes. A paid crowd sourcing platform acts as a broker between requesters who publish microtasks and workers who complete those tasks in exchange for compensation. A substantial level of result quality can be achieved for basic tasks like natural language annotation, image labeling, and data labeling when introducing redundancy by passing the same task to multiple workers. In fact, similar result quality can be achieved as when using domain experts even with a small level of redundancy. When leveraging microtasks in a business context, it is crucial to understand what aspects are influencing the result quality and how a certain well defined level of result quality can be achieved for specific scenarios. Furthermore, concrete approaches are required to actively and efficiently manage the result quality.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access crowd sourcing applications or related data available in the cloud. For example, the data exception emitter could execute on a computing system in the cloud and emit data quality exceptions. In such a case, the crowd sourcing manager could receive the exception and store details related to the exception at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. A node in a cloud computing network is a computing device, including, but not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. A cloud computing node is capable of being implemented and/or performing any of the functionality set forth hereinabove.

FIG. 1 is a block diagram illustrating a system 100 for emitting exceptions responsive to data quality errors and forwarding the data quality errors to crowds in a crowd sourcing environment for correction, according to one embodiment described herein. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 118. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United. States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, removable memory cards, optical storage, flash memory or solid state storage devices (SSD). The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 contains an application 120 which is illustrative of the types of applications containing data which may suffer from data quality errors. Examples of application 120 include, but are not limited to, an MDM application, data warehouse application, an extract-transform-load application for integrating data from a source data system to a target data system, or an enterprise service bus (ESB) where, for example, lookup values need to be transcoded from a source data system to a target data system. It should be obvious to those skilled in the art that application 120 may be an application containing data whose quality is of importance. As shown, the memory 106 also contains a crowd sourcing manager 122. In some embodiments, crowd sourcing manager is an application platform, which, responsive to data quality errors, determines a set of requirements, identifies a crowd capable of correcting the errors, and routes the errors to the crowd for correction. In some embodiments, the crowd sourcing manager 122 is also configured to emit exceptions responsive to data quality errors. In still other embodiments, the crowd sourcing manager 122 is configured to receive user defined data quality errors.

As shown, the memory 106 also contains a data exception emitter 124. Data exception emitter 124 is an application generally configured to monitor data for violations of predefined data quality standards. In some embodiments, the data exception emitter 124 is a listener to which the application can delegate a data quality processing exception based on the data quality processing type. Data exception emitter 124 may then pass these data quality exceptions to the inbox of the crowd sourcing manager 122. For example, data exception emitter 124 may emit an exception to the crowd sourcing manager 122 upon receiving notification that addresses in a database fail to meet standardization requirements. In some embodiments, the functionality of data exception emitter 124 is integrated into the crowd sourcing manager 122, available as an application programming interface (API) to external applications, such as application 120. In other embodiments, the functionality of data exception emitter 124 is integrated into applications themselves, such as application 120. As depicted in FIG. 1, the data exception emitter 124 may run as a daemon installed on the system 102, which provides APIs which applications such as application 120 can invoke to consistently surface exceptions. In some embodiments, data exception emitter 124 provides a user interface (UI) which allows for the definition of a variety of exception types. Once the applications consume the data exception emitter 124 APIs, the data exception emitter 124 would then communicate the exceptions to the crowd sourcing manager 122 using notifications. Communication may be accomplished through any protocol, including but not limited to the Java message service (JMS), a web service, or a remote method invocation. In some embodiments, crowd sourcing manager 122 may be coded in the Java programming language, which would enable it to receive exceptions in a well defined XML format. (Java and all Java-based trademarks and logos are trademarks or registered trademarks of Oracle and/or its affiliates).

As shown, storage 108 also contains application data 126, which is general data stored by an application such as application 120. Application data 126, although depicted as a database, may take any form suitable for storing data, such as a text file, data warehouse, or relational database. Application data 126 may be owned by multiple entities, may be stored in several locations of a single computer, or may span across multiple computers. As shown, storage 108 also contains crowd sourcing repository 128. The crowd sourcing repository 128 stores policies related to the sensitivity of data, for example, the application data 126. Sensitivity of data may include different dimensions, such as whether the data itself can be shared with other people, or whether the source system containing the data can be accessed by external crowd workers to resolve certain data quality errors. Crowd sourcing repository 128 may also store policies related to the crowd itself. Crowd sourcing repository 128 may also provide policies centered around grouping of data quality exceptions based on type (e.g., 10 address standardization data quality exceptions may be the defined as the smallest unit of work placed on a crowd sourcing platform based on these policies. As shown, in one embodiment, the crowd sourcing repository 128 may be a database, but it may any form sufficient to store data. In some embodiments, the policies contained in crowd sourcing repository 128 may be specified in XML for streamlined communication with crowd sourcing manager 122.

As shown, the storage 108 of computer 102 also contains a crowd hierarchy 132, used to rank crowds available to correct data quality exceptions. Generally speaking, a hierarchy is an ordered set indicating the crowd's (or individual's) level in the hierarchy. A hierarchy may link entities in a vertical as well as a horizontal manner. Therefore, those entities vertically higher are "superior" to those beneath them in the hierarchy, while an entity is considered "equal" to those entities it is linked to horizontally. In some embodiments, nodes in crowd hierarchy 132 represent crowds; in other embodiments, nodes in crowd hierarchy 132 represent individual workers. In some embodiments where crowd hierarchy 132 represents individual workers, the hierarchy may be replaced by a graph to better capture certain attributes of the workers. Although crowd hierarchy 132 is shown as a database, any suitable data structure capable of maintaining a hierarchy may be implemented, and the particular format implemented should not be considered limiting of the disclosure.

The particular configuration shown in FIG. 1 should not be considered limiting of the disclosure. Any possible configuration of the items in memory 106 and storage 108 are contemplated. For example, application 120 and crowd sourcing manager 122 may be on the same or different computers; application data 126, crowd sourcing repository 128, and crowd hierarchy 132 may be on the same computer or different computers, and may be on the same or different computers as application 120 and crowd sourcing manager 122.

Figure 2:
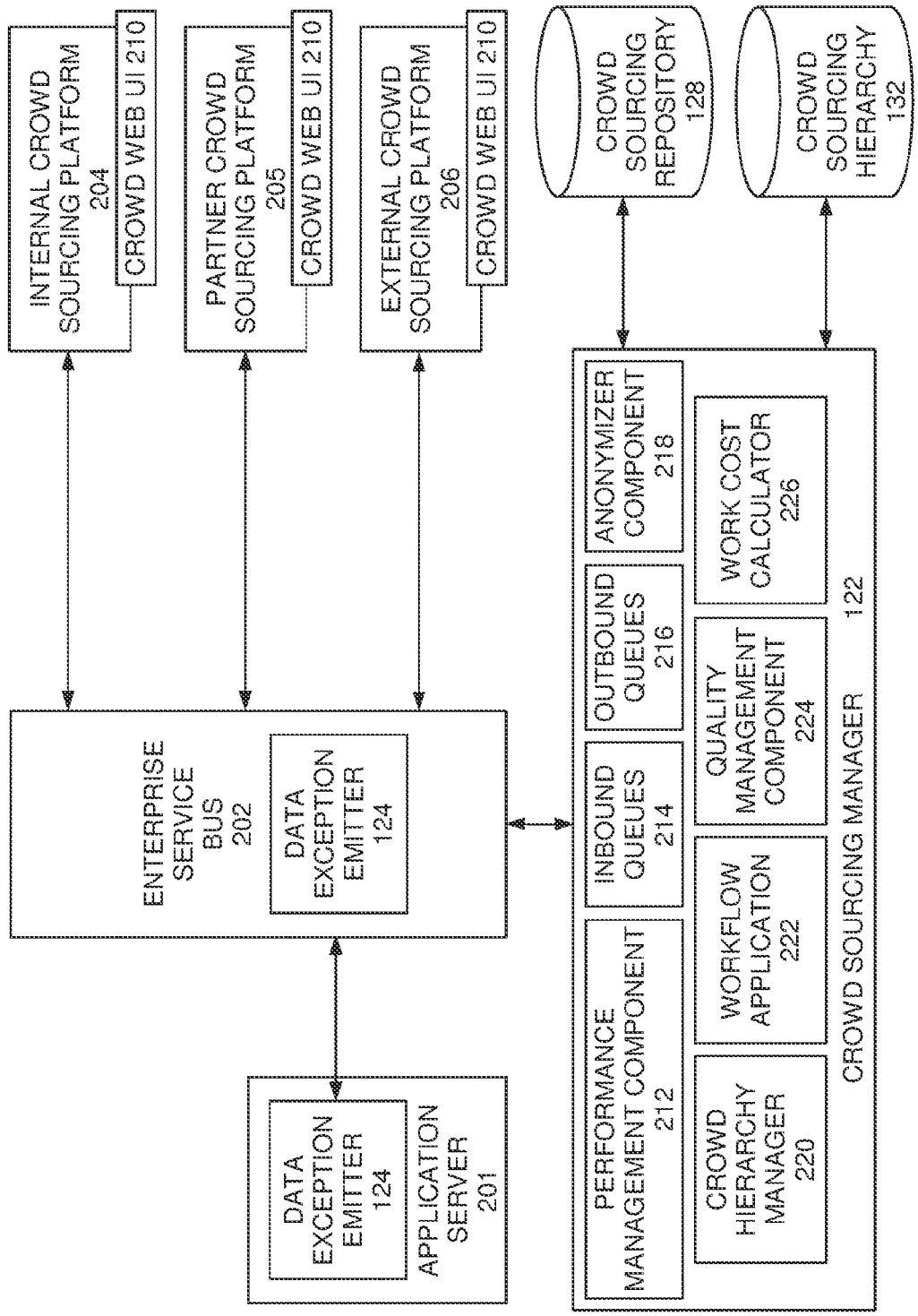
FIG. 2 is a block diagram illustrating an application architecture for emitting exceptions responsive to data quality errors and forwarding the data quality errors to a crowd in a crowd sourcing environment for correction, according to one embodiment described herein.

FIG. 2 is a block diagram illustrating application architecture 200 for emitting exceptions responsive to data quality errors and forwarding the data quality errors to a crowd in a crowd sourcing environment for correction, according to one embodiment described herein. As shown, FIG. 2 depicts three types of crowd sourcing platforms: external crowd sourcing platform 204, partner crowd sourcing platform 205, and internal crowd sourcing platform 206. As shown, each of the three crowd sourcing platforms has a crowd web user interface (UI) 210 which allows for communication between the enterprise hosting the application architecture 200 and the crowd accessing the application architecture 200. For example, crowd web UI 210 may be accessed by crowd members to retrieve work assignments as well as post completed assignments. Although shown as a single entity, crowd sourcing platforms 204-206 may each comprise multiple distinct crowds. The crowd sourcing platforms 204-206 vary based on the organization staffing the crowd and the composition of its crowd members. Internal crowd sourcing platform 204 is generally a crowd "internal" to the enterprise having the data quality errors needing correction. Thus, crowd members in the internal crowd sourcing platform 204 are also employees of the enterprise. For example, the internal crowd sourcing platform 204 could comprise enterprise employees in a call center or service center owned and operated by the enterprise, and the crowd members are therefore employees of the enterprise. In such a scenario, privacy concerns are minimized, as sensitive data would be viewed by employees of the enterprise under an internal privacy policy. Partner crowd sourcing platform 205 is a crowd sourcing platform hosted by an external company, but does not have general accessibility. This generally implies that the partner enterprise offering partner crowd sourcing platform 205 agrees to data security and privacy policies in an agreement with the enterprise seeking to utilize partner crowd sourcing platform 205. Furthermore, only employees the partner enterprise has under contract can work on the crowd sourcing tasks. Generally, external crowd sourcing platform 206 is a crowd external to the enterprise; neither the crowd nor its employees are related to the enterprise. External crowd sourcing platform 206 is available for use by the general public. Care must be taken when transmitting assignments to an external crowd, as sensitive data may be viewed, which may result in breaching privacy agreements, laws, and other regulations. Examples of external crowd sourcing platform 206 include Mechanical Turk by Amazon, Inc. It should be noted that each crowd may not comprise distinct sets of individuals. For example, an employee of a corporation might belong to its internal crowd, but the employee may also register for a public crowd which is open to all people.

As shown, the application architecture 200 also has enterprise service bus (ESB) 202. Enterprise service bus 202 is a general purpose ESB, which is a model used for designing and implementing the interaction and communication between mutually interacting software applications in a service oriented architecture. The main duties of an ESB are to monitor and control routing of message exchange between services, resolve contention between communicating service components, control deployment and versioning of services, marshal use of redundant services, and cater for commonly needed commodity services like event handling and event choreography, data transformation and mapping, message and event queuing and sequencing, security or exception handling, protocol conversion and enforcing proper quality of communication services. ESB 202, in some embodiments, therefore serves as an intermediary for communications between application server 201, crowd sourcing manager 122, and crowd sourcing platforms 204-206. Application server 201 is a server on which applications such as application 120 are executed. ESB 202 is also shown as having an instance of data exception emitter 124, according to one embodiment described above. Data exception emitter 124 is also shown in application server 201. This configuration therefore depicts an embodiment where the data exception emitter 124 is installed as a daemon on the systems where the application 120 and ESB 202 are installed. In the case of the ESB 202, the data exception emitter 124 may emit ESB exceptions, such as a data type exception when converting a message from a source to target application.

As shown, the application architecture 200 also contains crowd sourcing manager 122, according to one embodiment disclosed herein. Generally, crowd sourcing manager 122 performs several important functions responsive to receiving an exception from data exception emitter 124. In the embodiment depicted in FIG. 2, crowd sourcing manager 122 contains components which perform specialized functions, including performance management component 212, inbound queues 214, outbound queues 216, anonymizer component 218, crowd hierarchy manager 220, workflow application 222, quality management component 224, and work cost calculator 226. The inbound queues 214 and outbound queues 216 are storage queues for data quality exceptions. In some embodiments, multiple queues may be designated for each type of data quality exception classification. The inbound queues 214 receive data quality exception messages from the data quality exception emitter 124, storing the exception for later processing within crowd sourcing manager 122. The outbound queues 216 send work packages to the appropriate crowd sourcing platforms. Based on the policies enforced by the workflow application 222, the inbound messages are picked up and either sent individually or combined in "work packages" to appropriate crowd sourcing platforms 204-206 based on data privacy and data security policies. In some embodiments, the outbound queues 216 persist a local copy of the transmitted work packages for tracking purposes if a result (or multiple results if the task is sent multiple times to different crowd workers) is returned. In some embodiments, at the time the task sent via outbound queue 216, a timer is started to determine whether results are being returned within the maximum processing time. Workflow application 222 is an application generally configured to contain defined workflows for processing the data quality exceptions in inbound queues 214. Based on the policies in crowd sourcing repository 128, workflow application 222 routes the data quality exceptions in inbound queues 214 to internal, partner, or external crowd sourcing platforms 204-206. Workflow application 222 also monitors the performance of these crowd sourcing platforms as well as the accuracy of their work.

Quality management component 224 assesses the quality of work assignments completed by individual crowd workers as well as groups of workers as a whole. Quality management component 224 is invoked by workflow application 222 as needed to update the crowd hierarchies in crowd hierarchy component 220. In such instances, quality management component 224 may return a level of work quality performed by a crowd, or individuals in a crowd. The level of work quality may be an aggregate of all tasks completed, or based on specific tasks completed.

Anonymizer component 218 provides the ability to anonymize sensitive (private) data. In some embodiments, anonymizer component 218 can be invoked to mask data where appropriate to meet data security and data privacy policies without preventing the ability of crowd workers to work on data to complete data quality errors. Data masking includes replacing real data values with realistic values generated by a masking algorithm. Any suitable masking algorithm may be integrated in anonymizer component 218. In some cases, data cannot be anonymized, and therefore cannot be sent to an external crowd sourcing platform 206.

Crowd hierarchy manager 220 creates and manages hierarchies of different worker communities within a crowd as well as across crowds. In some embodiments, crowd hierarchy manager 220 also creates and manages hierarchies of individual workers. FIG. 2 depicts crowd hierarchy 132, an exemplary hierarchy. A hierarchy created and managed by crowd hierarchy manager 220 may be useful in information governance scenarios where, based on the sensitivity of the data involved, multiple levels of crowd sourcing are needed. In such a scenario, users/stewards at higher levels in the hierarchy perform necessary validation on the responses generated by a lower-level crowd system. For example, an internal set of data stewards at a higher level in the hierarchy may validate spelling corrections for certain business terms completed by an external crowd.

In creating crowd hierarchy 132 or adding new crowds to crowd hierarchy 132, crowd sourcing manager 220 may take any number of approaches. Crowd sourcing manager 220 may assign an initial score to all crowds, whereby a newly created crowd would have a single level of nodes, resulting in a hierarchy of equally ranked crowds. In other embodiments, crowd sourcing manager 220 may randomly arrange the crowds in crowd hierarchy 132. Generally, crowd sourcing manager 220 may take any suitable steps to create the crowd hierarchy 132 or add new crowds to the crowd hierarchy 132.

In one embodiment, crowd hierarchy 132 is a hierarchy of different crowd systems, where crowd hierarchy manager 220 ranks each crowd system in the crowd hierarchy 132 and assigns each crowd system a cumulative weight. The weight associated with a crowd indicates the overall authority of the crowd system in performing the tasks under the current assignment as well as in evaluating the tasks completed by other crowd systems in the crowd sourcing hierarchy. In some embodiments, crowd hierarchy manager 220 computes a set of weights corresponding to various relevant attributes of the crowd, such as domain of expertise, languages spoken, geographic location, etc. In some embodiments, crowd hierarchy manager 220 may compute a weight range, representing minimum and maximum performance thresholds for the crowd. Crowd hierarchy manager 220 may also update these weights via internal feedback mechanisms. In some embodiments, crowd sourcing manager 220 may compute weights based on the correctness of actual work completed. In some embodiments, crowd sourcing manager 220 may also use confidence levels and position in the crowd hierarchy 132 to influence the computed weights.

For the purpose of computing weights, in embodiments where crowd systems are ranked by crowd hierarchy manager 220, a crowd system may be defined as a set S of people, $\{s\_i\}$ assigned to complete a crowd sourced task. A crowd profile may be defined as a tuple of the form $\{S, w\}$, where $w \in (-\infty, \infty)$ is the profile weight associated with crowd system S. A crowd sourcing hierarchy, $C=\{\{S\_i, w\_i\}\}$ is defined as an ordered set of crowd systems $S\_i$ and associated weights $w\_i$, where i indicates the level in the hierarchy. For example, in an exemplary hierarchy, $\{\{S\_1, w\_1\}, \{S\_2, w\_2\}, \ldots\}$, $S\_1$ lies at the bottom of the hierarchy, $S\_2$ at the next level in the hierarchy, and so on.

Based on these definitions, crowd sourcing manager 220 may compute and update the weights as follows. Let t be a task assigned to a crowd system, $S\_j$. Further, let f(t) denote expected output of the task t, as decided by a crowd system, $S\_i$, where i>j (implying $S\_i$ is more authoritative than $S\_j$ and thus, has the ability to 'judge' the work done by $S\_j$). Let p denote the probability with which $S\_i$ believes that the outcome of task t should be f(t). This probability captures difference in opinions among the members of the crowd system, $S\_i$. Lastly, let g(t) denote the outcome of the task t, as computed by the crowd system $S\_j$, with probability q. This probability captures the difference in opinions among the members of the crowd system, $S\_j$.

Finally, assume there is a deterministic function $J(f(t), g(t)) \in [-y,y]$ that is able to compare f(t) and g(t) and return a numeric value based on their similarity. For example, if t is a task to correct typos, then J can be a function comparing word distances. For example, if the typo is "Interrelation Business Machine", f(t) is "International Business Machines" and g(t) is "International Business Machines", then J would return y. However, if g(t) is "Interrelational Business Machines", then J would return a value in (0, y). If g(t) is "Blue Jeans", J would return a value closer to −y. Given this generic scenario, the following feedback relationships for weight computation by crowd hierarchy manager 220 may be defined.

Assuming a predefined threshold T, $T \in R$, in the case where p is much greater than q (e.g., p−q>=T), the crowd hierarchy manager 220 uses the formula to compute the weight $w\_j=w\_j+(p-q)*J(f(t), g(t))-K$, where K is a constant. This scenario indicates that a more authoritative crowd system is very confident about f(t), whereas the less authoritative crowd system has a low confidence level of g(t). By using this formula, $S\_j$ receives a positive weight increment if J evaluates to a positive value (since p−q>0), however, $S\_j$ is also penalized for the overall low confidence even if the overall result of the task is correct, by deducting the adjustable constant, K.

In cases where p is much less than q, (e.g., q−p>=T), then crowd hierarchy manager 220 uses the formula to compute the weight $w\_j=w\_j+q*J(f(t), g(t))$. This represents a scenario where a more authoritative crowd system is less confident about f(t), whereas a less authoritative crowd system has high confidence on g(t). Thus, using the formula, crowd hierarchy manager 220 simply rates $S\_j$ based on their performance, and no penalties are taken. However, the crowd hierarchy manager 220 may introduce a subtlety here, since p is much less than q (i.e. a large number of less authoritative people agree on an outcome, while more authoritative people have considerable disagreement over the expected outcome). In these cases, crowd hierarchy manager 220 performs the following steps. First, crowd sourcing manager 220 determines if there is any crowd system $S\_k$ that has more authority (is higher up the hierarchy) than $S\_i$, and requests feedback on the expected outcome of task t. The expected outcome of $S\_k$ can be y(t). If $J(y(t), f(t))>J(y(t), g(t))$, then crowd hierarchy manager 220 does nothing. However, if $J(y(t), f(t))<J(y(t), g(t))$, then the crowd hierarchy manager 220 imposes upon $S\_i$ some weight deduction because it was low on confidence and came up with a wrong expectation of the task outcome while being higher up the hierarchy. Thus, the crowd hierarchy manager 220 recomputes the weight of S_i as follows: w_i=w_i−K*i, where K is a constant, meaning that the penalty for performing poorly is directly proportional to the level a crowd system is at. In addition, the crowd hierarchy manager 220 does not penalize S_j for its answer; therefore the crowd hierarchy manager 220 updates the weight for S_j using the following equation: w_j=w_j+q*J(y(t), g(t))+K, where K is a constant awarded to S_j for performing significantly above set expectations.

In the remaining permutations of p and q, the crowd hierarchy manager 220 computes the weight of S_j using the following equation: w_j=w_j+|p−q|*J(f(t), g(t)). Thus, the crowd hierarchy manager 220 simply takes the modulo of p and q so that S_j gets a reward if J(f(t),g(t))>0 and a punishment if J(f(t),g(t))<0.

As described above, in another embodiment, the crowd sourcing manager 220 may compute a hierarchy with a finer granularity, where each node along the hierarchy represents an individual worker instead of the entire crowd. In such an embodiment, weights assigned reflect the quality of results delivered by each individual worker. In some embodiments, a graph may be implemented in place of a hierarchy, which represents non-trivial relationships between individuals where it might not be possible to align the set of individuals along a simple hierarchy. For example, one worker may be exceptional in certain domains of expertise, yet have poor language skills. Another worker may have poorer knowledge in the domain of expertise, yet possess superior language skills. By encoding this varying knowledge in a consumable form in a graph, the crowd sourcing manager 220 is enabled to make intelligent suggestions for routing assignments based on the specific requirements of the task. Crowd hierarchy manager 220 may use the formulas described above in computing weights to be assigned in such an embodiment.

In still another embodiment, the crowd hierarchy manager 220 may compute a hierarchy of worker pools, where each node along the hierarchy is representative of overlapping subsets across different crowd sets. For example, the crowd hierarchy manager 220 may compute a worker pool comprising the top five (based on individual weights) domain experts from a set of 100 domain experts and the top five language specialists from a different set, thus forming a special worker pool comprising workers having domain expertise and special language skills.

Returning to FIG. 2, also depicted is performance management component 212, which is used to escalate tasks if the service level agreement (SLA) for a crowd sourcing task is violated. Performance management component 212 also monitors the timer set when work is placed in the outbound queue. Violations of the SLA may be related to the accuracy of work completed, or to the rate at which work is completed, such that the work may not be completed within the specified amount of time. In embodiments where the violation is accuracy related, for example, if a task is given to a group of n crowd workers, and the results for the first x assignments (where x<n) do not meet a specified accuracy threshold, performance management component 212 may escalate the remaining tasks to crowd workers whose weights related to quality of work are higher, so that the expected average accuracy threshold may still be met. By making such a decision, the performance management component 212 ensures that crowd workers not meeting the minimal accuracy record are removed from the task. In some embodiments, the performance management component 212 ensures that a worker can no longer see and work on a task. In embodiments where the violation is time related, for example, a crowd sourcing task is normally completed in 5 days, and only 1 day is remaining for the task to be completed, performance management component 212 may escalate the task to more crowd workers, or may assign the task to workers whose weights related to productivity are greater, such that the task is completed on time.

Also shown in FIG. 2 is work cost calculator 226. In some embodiments, work cost calculator 226 is invoked by workflow application 220 to compute the cost for different task deployment strategies to different crowds. In some embodiments, performance management component 212 may invoke work cost calculator 226 upon escalating a task to determine the costs of introducing additional workers, or escalating to workers having higher quality or productivity weights. In some embodiments, work cost calculator 226 may be invoked to compute the estimated cost of correcting a set of data quality errors. The cost of correcting the data quality errors may be based on any number of variables, including, but not limited to, the type of data quality errors, the number of data quality errors, the skill level required to correct the data quality errors, the number of individuals required to correct the data quality errors, the amount of time required to correct the data quality errors, the amount of time within which the data quality errors must be corrected, and whether corrections completed by a crowd must be verified by a crowd higher in the crowd hierarchy 132. For example, some tasks, like reconciling duplicate data records might be initially sent to only one crowd worker and incrementally be posted more often until a certain quality threshold is reached. To achieve such a result, mechanisms such as "dynamic majority vote" (DMV) can be implemented. Alternatively, a task can be posted multiple times and a mechanism computing a statistical result can be used to make a decision on the final result. For example, in the case of duplicate records, the statistic on which value has been identified by the crowd worker to be correct can be determined, or the value taken by most of the crowd workers is considered to be the correct one. Methods such as these allow for grading the work of the crowd worker; the closer the result of an individual crowd worker to the final result, the better his work performance indicator is. Aggregating this data for crowd workers from the same platform can be used to determine the equality of work done on a certain crowd platform. If an individual worker overachieves or underachieves comparative to the average level of correctness delivered by the workers within his crowd system, he might be moved to a more (or less) authoritative crowd system (which has comparable attributes except for the average correctness delivered by its workers). In other embodiments, work cost calculator 226 may compute wages based on crowd profiles. In some embodiments, work cost calculator 226 defines a wage function for a crowd system S_i for a task t as: f(w_i, t)=r*(w_i+J(f(t), g(t))), where r is the base rate, which is set by the enterprise's cost spending expectations, market standards, or any suitable method. By implementing this equation, work cost calculator 226 captures three important concepts. First, work cost calculator 226 pays a crowd system a base wage (captured by r*w_i) irrespective of the task outcome expectation. Second, work cost calculator 226 marginally penalizes or rewards a crowd system based on the outcome of the task (captured by r*J(f(t),(g(t)))). Finally, work cost calculator 226 decides a crowd system's base wage based on their previous work history and authority on the subject (captured by multiplicative weight w_i).

Figure 3A:
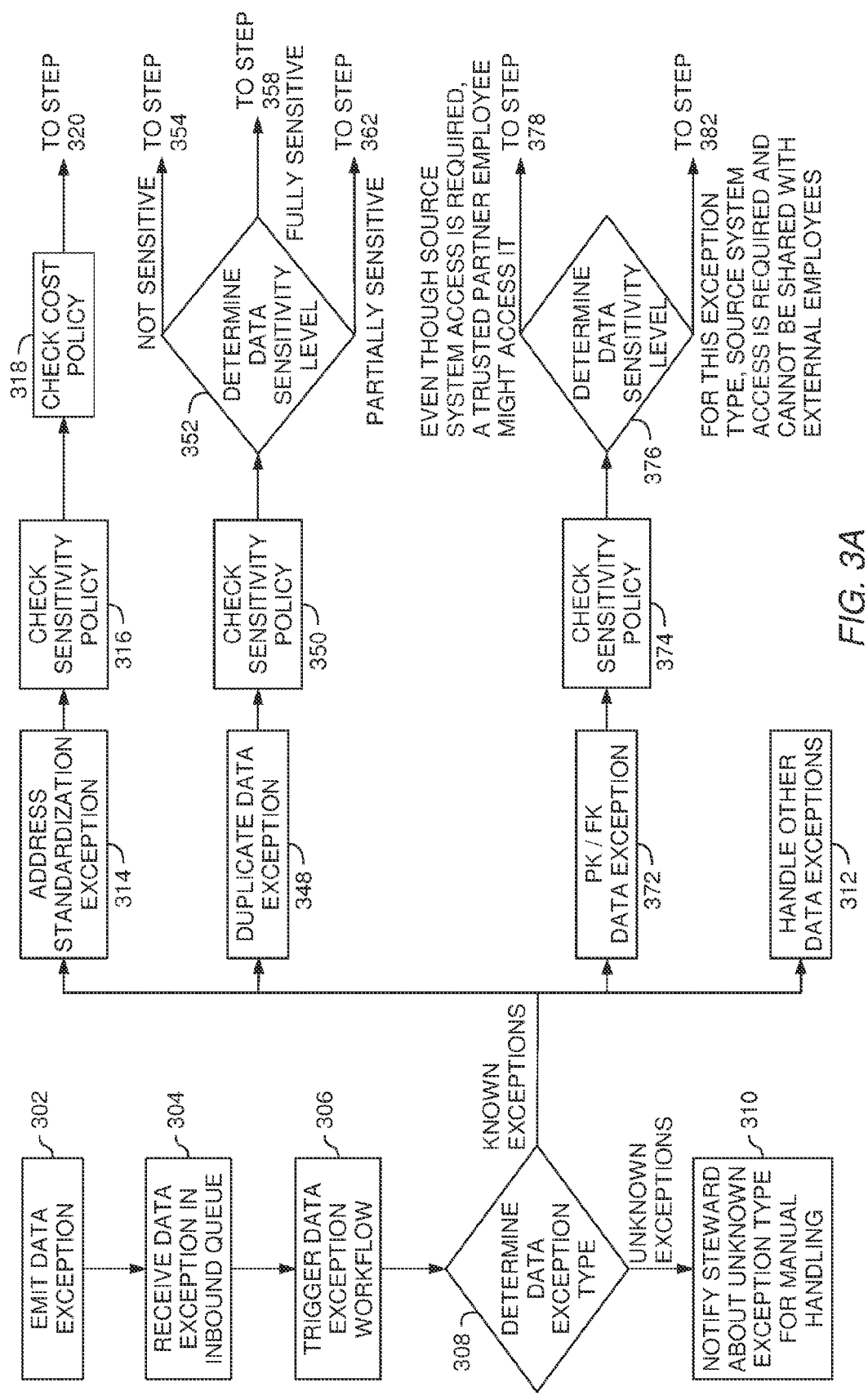
FIGS. 3A-3C are flow charts illustrating a method for emitting exceptions responsive to data quality errors and forwarding data quality errors to a crowd in a crowd sourcing environment for correction, according to one embodiment described herein.
Figure 3B:
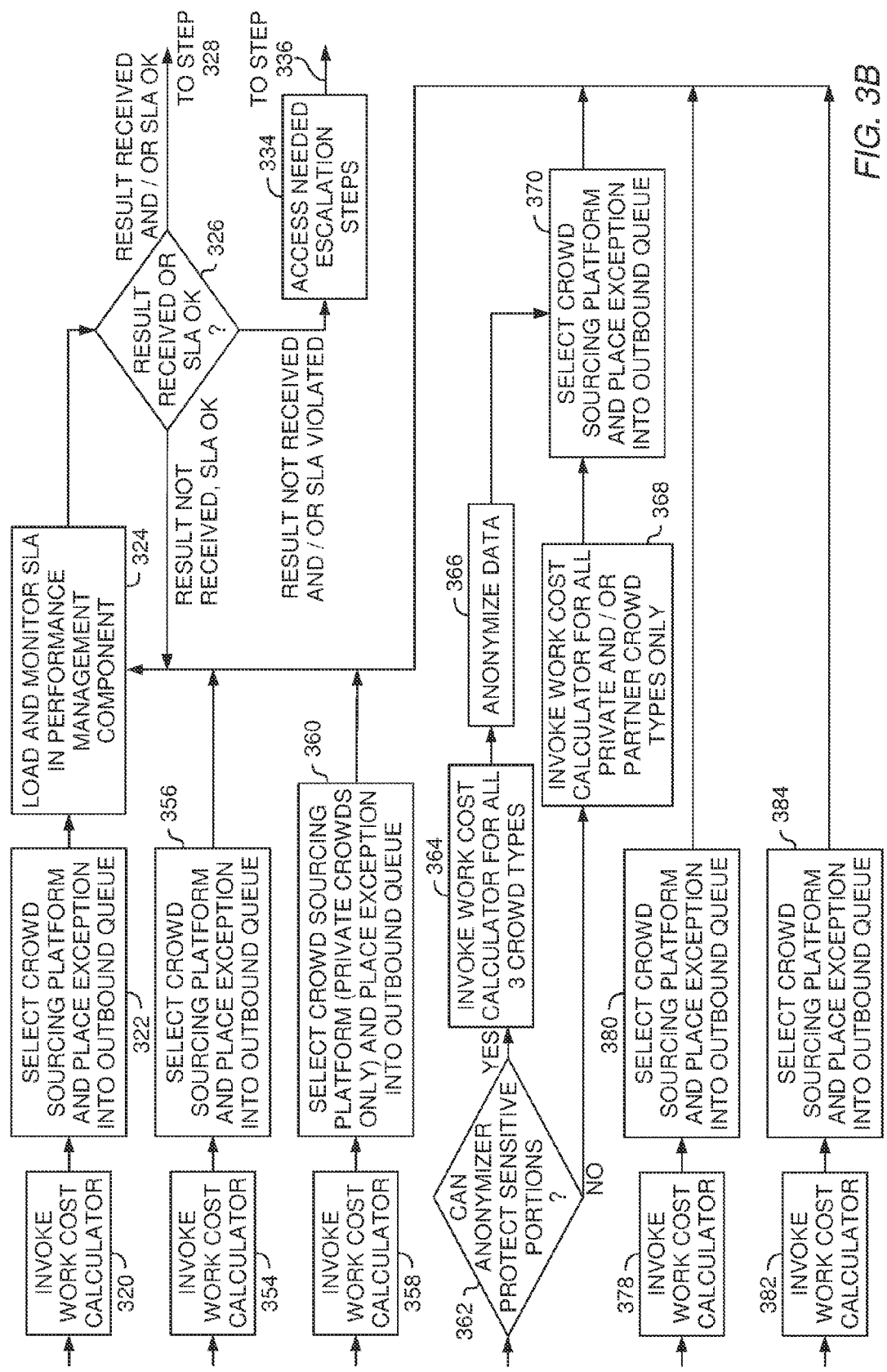
Figure 3C:
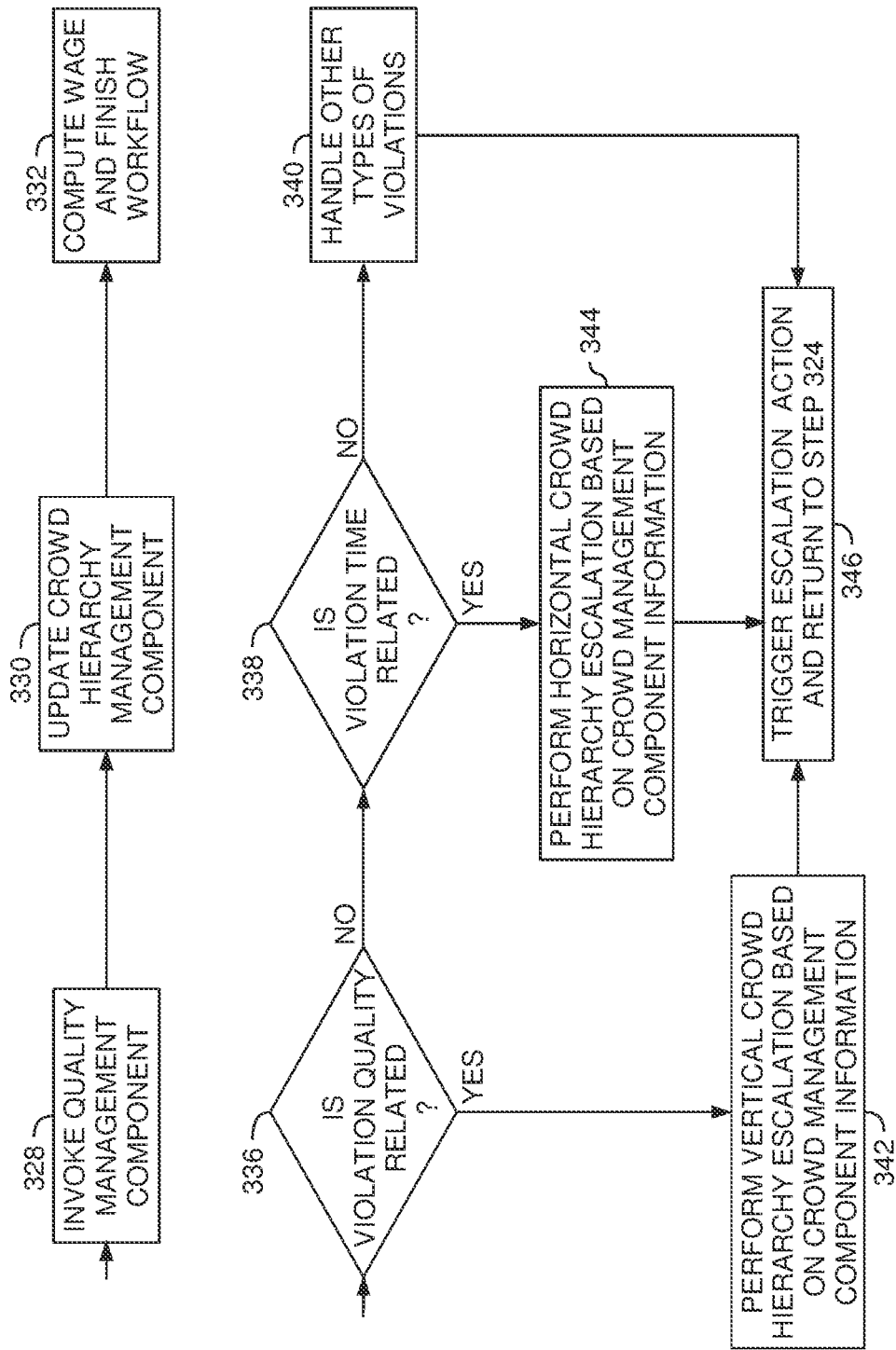

FIGS. 3A-3C are flow charts illustrating a method 300 for emitting a data quality exception responsive to data quality errors and forwarding the data quality errors to a crowd in a crowd sourcing environment for correction, according to one embodiment described herein. The method begins at step 302, where data exception emitter 124 emits a data exception upon being delegated a data quality error. In other embodiments, the data exception may be manually specified by a user who detects the data quality error. For example, application 120 may detect a series of spelling errors contained in application data 126, and send a data quality processing exception to data exception emitter 124 in response. In some embodiments, the data exception emitter 124 may emit the data exception to crowd sourcing manager 122. In some embodiments, the data exception emitter emits the data exception to enterprise service bus 202, which forwards the data exception to crowd sourcing manager 122. At step 304, crowd sourcing manager 122 receives the data exception in the inbound queue 214. Upon receiving the data exception in inbound queue 214, crowd sourcing manager 122 invokes workflow application 222 to trigger a data exception workflow at step 306, as defined by the policies in crowd sourcing repository 128. At step 308, crowd sourcing manager 122 determines the data exception type, and determines whether the exception is known or unknown. If the exception is unknown (i.e., has not been defined), the crowd sourcing manager 122 proceeds to step 310, where crowd sourcing manager 122 notifies a steward that an unknown exception has been detected, and that user input is needed to define the exception. If the data exception type is known, the crowd sourcing manager 122 determines its type, and proceeds accordingly. As examples, three different exception types are provided, and a fourth catchall has been provided. If, for example, crowd sourcing manager 122 determines the exception type is none of the three specific examples listed in elements 314, 348, or 372, crowd sourcing manager 122 proceeds to step 312 to handle other data exceptions.

In one embodiment, at step 314, crowd sourcing manager 122 may determine that the data quality exception is an "address standardization exception." For example, the data exception may be related to invalid zip code or state code formats. Upon determining an address standardization exception has been emitted, the crowd sourcing manager 122 proceeds to step 316, where the crowd sourcing manager 122 checks the sensitivity policy related to address standardization exceptions for the enterprise, as defined in crowd sourcing repository 128. Upon referencing the crowd sourcing repository, the crowd sourcing manager 122 may determine that address standardization exceptions are not sensitive exceptions, and therefore privacy is not a concern. Therefore, any of the three crowd sourcing platforms 204-206 may be sent the address standardization exceptions. The crowd sourcing manager 122 then proceeds to step 318, where a cost policy contained in crowd sourcing repository 128 is checked to determine the enterprises' planned budget for correcting address standardization exceptions. The crowd sourcing manager 122 then proceeds to step 320, depicted in FIG. 3B, where the crowd sourcing manager 122 invokes the work cost calculator 226. At step 320, work cost calculator 226 generates an estimated cost of completing the corrections based on sending the tasks to all available crowd sourcing options. At step 322, the crowd sourcing manager 122 selects a crowd sourcing platform and places the address standardization task into the appropriate outbound queue 216. The crowd sourcing manager 122 also creates the appropriate outbound queue 216, if necessary. As stated above, a timer is also started by workflow application 222 upon placing the work package in the outbound queue 216. The crowd sourcing manager 122 selects the crowd sourcing platform based on the information it has gathered by checking the cost policy, sensitivity policy, and invoking work cost calculator 226 to find the most cost effective solution which will complete the task without violating any policies. For example, the crowd sourcing manager 122 may determine that it is more cost effective to route the task to an internal crowd, upon determining that the internal crowd has available resources to take on the task, thereby optimizing the productivity of the internal crowd. The crowd sourcing manager 122 then proceeds to step 324, where it loads the service level agreement into the performance management component 212 for monitoring.

Before moving to step 324, which is common to all types of data quality errors, we may move to step 348, depicted in FIG. 3A, where the crowd sourcing manager 122 determines that the data exception type is a "duplicate data exception." A duplicate data exception may be triggered as the result of having duplicate data records in the same relational database, or redundancy across relational databases across multiple systems. Regardless of the type of duplicate data exception, human intervention is necessary to remove the duplicate entries. The crowd sourcing manager 122 thus moves to step 350, where the crowd sourcing manager 122 checks the sensitivity policy related to duplicate data exceptions for the enterprise, as defined in crowd sourcing repository 128. The crowd sourcing manager 122, then, at step 352 determines the data sensitivity level based on the sensitivity policy. If the data is not sensitive, the crowd sourcing manager 122 proceeds to step 354. If the data is fully sensitive, the crowd sourcing manager 122 proceeds to step 358. If the data is partially sensitive, the crowd sourcing manager 122 proceeds to step 362. At step 354, depicted in FIG. 3B, the crowd sourcing manager 122 invokes work cost calculator 226. At step 354, work cost calculator 226 generates an estimated cost of completing the corrections based on sending the tasks to all available crowd sourcing options, including internal, external or partner crowd sourcing platforms 204-206. At step 356, described in more detail above with reference to step 322, the crowd sourcing manager 122 selects a crowd sourcing platform and places the duplicate data exception assignment into the appropriate outbound queue 216. The crowd sourcing manager 122 then proceeds to step 324, where it loads the service level agreement into the performance management component 212 for monitoring.

Returning to step 358, depicted in FIG. 3B, the crowd sourcing manager 122, upon determining that the data sensitivity level is fully sensitive, invokes the work cost calculator 226 to compute the cost of having the work completed by an internal crowd sourcing platform 206. An internal crowd sourcing platform is required to prevent a violation of data privacy policies, laws, and regulations. At step 360, described in detail above with reference to step 322, the crowd sourcing manager 122 selects an internal crowd sourcing platform 205 and places the duplicate data exception assignment into the appropriate outbound queue 216. The crowd sourcing manager 122 then proceeds to step 324, where it loads the service level agreement into the performance management component 212 for monitoring.

Returning to step 362, depicted in FIG. 3B, the crowd sourcing manager 122, upon determining that the data sensitivity level is partially sensitive, determines whether anonymizer component 218 can mask the data to protect sensitive portions. If the crowd sourcing manager 122 determines that the anonymizer component 218 can protect sensitive data, the method proceeds to step 364; otherwise, the method proceeds to step 368. At step 364, the crowd sourcing manager 122 invokes the work cost calculator 226 to generate an estimated cost of completing the corrections based on sending the tasks to all available crowd sourcing options, including internal, external or partner crowd sourcing platforms 204-206. At step 366, the crowd sourcing manager 122 invokes the anonymizer component 218 to mask the sensitive data, as described above. The crowd sourcing manager 122 then proceeds to step 370. Returning to step 368, the crowd sourcing manager 122, upon determining that the anonymizer component 218 cannot protect sensitive data, invokes the work cost calculator 226 to generate an estimated cost of completing the corrections based on sending the tasks to internal crowd platforms 204 and partner crowd sourcing platforms 205. Upon calculating the work cost, the method proceeds to step 370. At step 370, described in more detail above with reference to step 322, the crowd sourcing manager 122 identifies the selected crowd sourcing platform and places the duplicate data exception assignment into the appropriate outbound queue 216. The crowd sourcing manager 122 then proceeds to step 324, where it loads the service level agreement into the performance management component 212 for monitoring.

Before moving to step 324, which is common to all types of data quality errors, we may move to step 372, depicted in FIG. 3A, where the crowd sourcing manager 122 determines that the data exception type is a "primary key/foreign key data exception." Such an exception may be triggered in response to a lack of referential integrity in a database. For example, in the database of a bank, all accounts have to be attached to a customer. Therefore, the customer table contains a primary key (e.g. an ID) which is referenced by a foreign key in the account table. If for any reason, this foreign key does not match any of the primary keys in the customer table, manual effort is typically required to sort out what went wrong. Upon determining that the data exception type is a primary key/foreign key data exception, the crowd sourcing manager 122 proceeds to step 374, where the crowd sourcing manager 122 checks the sensitivity policy related to primary key/foreign key data exceptions for the enterprise, as defined in crowd sourcing repository 128. The crowd sourcing manager 122, then, at step 376 determines the data sensitivity level based on the sensitivity policy. Because primary key/foreign key exceptions arise in the context of a relational database, access to the database may be needed to correct the exceptions. Therefore, the policy requires at least some degree of sensitivity measures. In some cases, even though source access is required, a trusted partner employee may access the source. If the exception is only concerned with sensitivity of the data itself, then the crowd sourcing manager proceeds to step 378. If correction of the exception requires access to the database, then the sensitivity policy restricts the crowd sourcing manager 122 to the selection of an internal crowd sourcing platform 204. In other words, in most cases, an employee of the enterprise owning the database must complete the corrections. In such an event, the crowd sourcing manager proceeds to step 382.

At steps 378 and 382, depicted in FIG. 3B, the crowd sourcing manager 122 invokes the work cost calculator 226. At step 378, the work cost calculator 226 computes the cost of completion on any available internal crowd sourcing platform 204 or partner crowd sourcing platform 205. The method then proceeds to step 380. At step 382, the work cost calculator 226 computes the cost of completion on any available internal crowd sourcing platform 204. The method then proceeds to step 384, described in more detail above with reference to step 322, where the crowd sourcing manager 122 identifies the selected crowd sourcing platform and places the primary/key foreign key data exception assignment into the appropriate outbound queue 216. The crowd sourcing manager 122 then proceeds to step 324, where it loads the service level agreement into the performance management component 212 for monitoring.

At step 324, performance management component 212 begins monitoring the task. At step 326, performance management component 212 determines whether the SLA agreement has been violated, and monitors the rate and quality of completed assignments returned by the selected crowd. If, at step 326, performance management component 212 determines that results have not been received, or the SLA has been violated, it returns to step 324 for continuous monitoring. If, at step 326, performance management component 212 determines that a violation has occurred, the performance management component 212 proceeds to step 334 in order to assess the types of escalation steps it must take in response. At step 336, depicted in FIG. 3C, the performance management component 212 determines whether the violation is accuracy related. As described above, an accuracy violation indicates that results being received are not of a sufficient accuracy, and the task needs to be escalated to a crowd having a higher weight related to skill level. If the violation is accuracy related, the method proceeds to step 342, where the performance management component 212 performs "vertical" crowd hierarchy escalation, where a crowd with a higher rank in the hierarchy related to skill level is selected to complete the tasks, which are rerouted to the new crowd for completion. Upon completing the escalation, the method proceeds to step 346. If the violation is not accuracy related, the performance management component 212 proceeds to step 338 where the performance management component 212 determines whether the violation is time related. If the violation is time related, at step 344, the performance management component 212 performs "horizontal" crowd hierarchy escalation to assign future tasks to more crowd workers at the same skill level to ensure that the overall number of tasks is completed on time. In other embodiments, the performance management component 212 may perform a "vertical" escalation at this step to reroute the tasks to members of a crowd having a higher rank for productivity. Upon completing the escalation, the method proceeds to step 346. If the violation is not time related, the method proceeds to step 340, where it handles all other types of violations. These violations may include SLA violations, where sensitive data was viewed or accessed by unauthorized crowd workers, in which case the performance management component 212 would reroute the assignment to crowd workers whose use of the data would not violate the SLA. At step 346, the escalation action is triggered and the method returns to step 324, depicted in FIG. 3B, to continue monitoring the process. If more assignments need to be passed to workers, the method returns to step 322.

Consider the following example being an exemplary data model of a table containing customer information. The table has the attributes (only a subset shown) as shown in Table 1. If the row shown below is send to a tool doing address standardization, the standardization with the default rule set will fail for the field Street. Modern tools are able to parse a string like "Main Street 1" and identify, that the token "Main" is a name, "Street" is an indicator of the type of street (e.g. "Street" vs. "Avenue") and the token "1" would be the house number (since it's an integer) and re-assign the number "1" to the HOUSENUMBER field. Now in our example we have the string "Main Street 1 001-456-9435278" where the tool with its default rules wouldn't know that the token "001-456-9435278" means since it does not have a rule for that (it's easy for us humans to spot that someone entered the data erroneously and, this is likely the phone number and should be placed in the PHONENUMBER column). In the context of the current disclosure, the data exception emitter 124 would emit an address standardization exception to the crowd sourcing manager 122 and received in the inbound queue 214 triggering a workflow there. Since the data exception emitter 124 emitted the exception for address standardization with a registered exception type in step 308 it would be determined that an Address Standardization Exception 314 must be processed. Since in our example, only the customer name in conjunction with the SSN is considered sensitive, the check policy step 316 would indicate that this exception can be routed to any crowd platform since no sensitive information is involved. In step 318 and 320 a cost check is made to see if the data exception maybe submitted to a crowd platform aligned with the company cost policies. So for example, the company might have a contract with an external, hybrid crowd sourcing company where the fee per address standardization exception would be 0.8 dollar/exception and an internal crowd sourcing platforms with an operational cost of 0.75 dollar/exception. However, since the workload management component for the internal crowd indicates that it is busy, it is decided to be sent to the external crowd. Since address standardization is per the configuration of our example considered to be a simple task to be done, it is posted only once and sent to the external hybrid crowd sourcing provider. This crowd sourcing provider (crowd system) may be part of a larger crowd-sourcing hierarchy maintained by the internal crowd-sourcing platform or by the external crowd sourcing company. For simplicity, assume there are 2 crowd systems in the hierarchy, viz., a set of authoritative (but expensive) domain experts in address standardization (within the company) called S_i and the crowd system comprising of people who work at the external company, called S_j. Also assume the weight of external crowd system is 4 and that of the internal system is 10. So, in effect, we have the following hierarchy: {{S_j, 4}, {S_i, 10}}. Assume that the crowd workers in S_j incorrectly assert that "001-456-9435278" is some combination of "house number and zip code" and classify it accordingly. In this case, assume that S_i knows with probability=1 (knows for certain) that the correct categorization must be "phone number" and nothing else. Also, workers in S_j are split in their opinion and although majority vote was "house number and zip code", the overall probability was 0.6 (6 out of 10 people were in favor). The threshold T=0.5. In this scenario, the crowd hierarchy manager 220 computes the function J (.,.), which in this case simply validates the classification that is being done by the crowd workers and returns a value, e.g., −1. Next, the crowd sourcing manager 122 invokes the crowd hierarchy manager 220, which reduces the weight of the crowd system S_j, w_j=4+|1−0.6|*(−1)=3.6 (penalty for incorrectness). Finally, the wage is computed for a fixed rate r=50 as, 50*(4+(−1))=150. This wage reflects a base pay for the effort made (50*4=200) depending on the work history (captured by the previous weight, 4) and a penalty for not giving expected results for this work item (−50).

| Column Name | Data Type | Length (if STRING type) | Sensitive | Value |
|---|---|---|---|---|
| CUST_NO | BIG INTEGER | | | 12345 |
| LASTNAME | STRING | 50 | yes | SMITH |
| FIRSTNAME | STRING | 50 | yes | JOHN |
| STREET | STRING | 150 | | Main Street 1 001-456-9435278 |
| HOUSENUMBER | STRING | 10 | | |
| CITY | STRING | 100 | | Los Angeles |
| ZIP CODE | INTEGER | | | 91423 |
| COUNTRY | STRING | 150 | | US |
| PHONENUMBER | STRING | 30 | | |
| SSN | STRING | 15 | yes | |

If, at step 326, performance management component 212 determines that the tasks have been fully completed by the crowd and that the SLA has not been violated, the method proceeds to step 328, depicted in FIG. 3C, where the crowd sourcing manager 122 invokes the quality management component 224. At step 328, the quality management component assesses the quality of the completed work. At step 330, the crowd sourcing manager invokes the crowd hierarchy manager 220 to update the crowd hierarchy 132, as described above. At step 332, the crowd sourcing manager 122 invokes work cost calculator 226 to compute a wage and complete the workflow.

Figure 4:
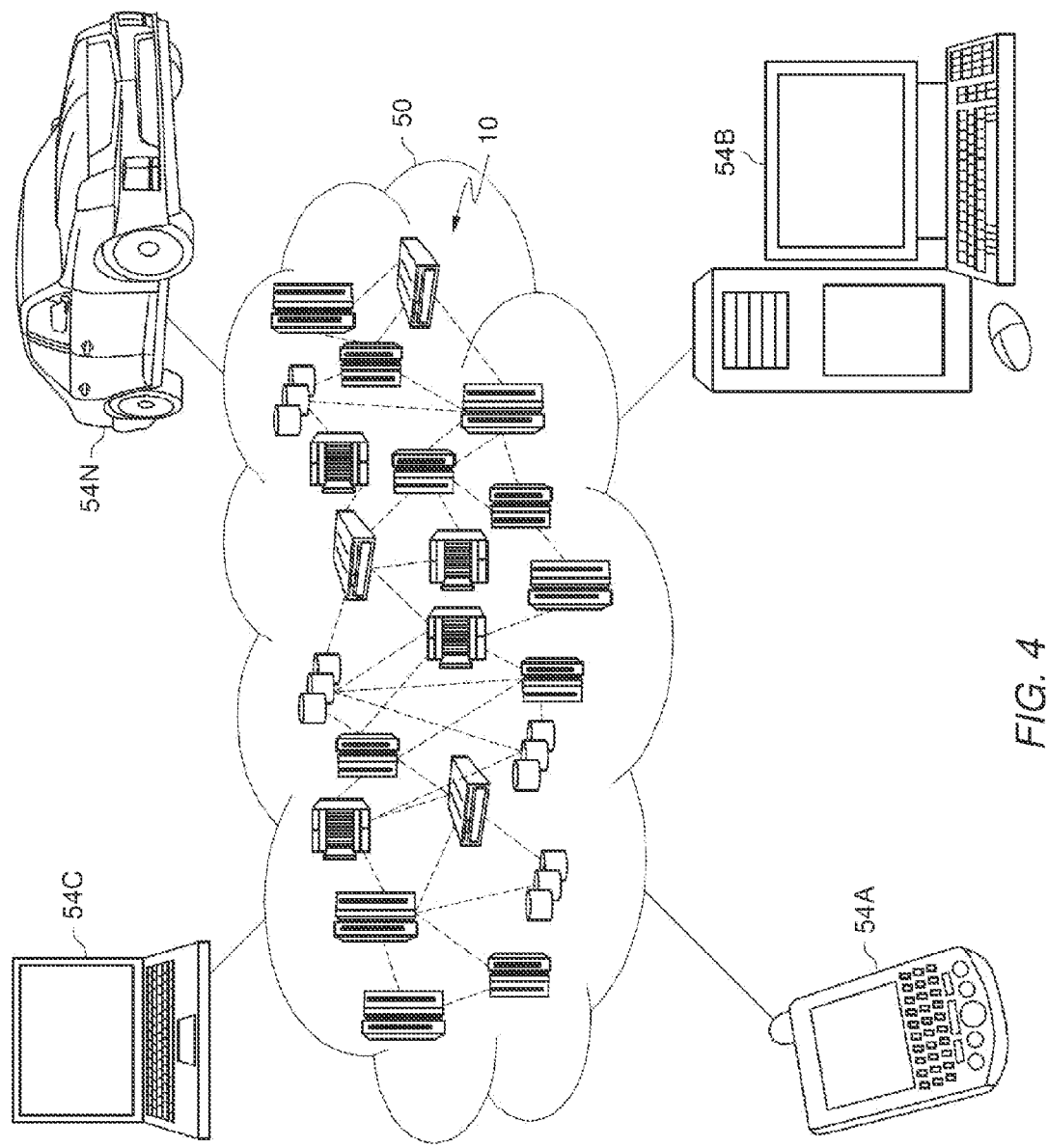
FIG. 4 depicts a cloud computing environment according to one embodiment described herein.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
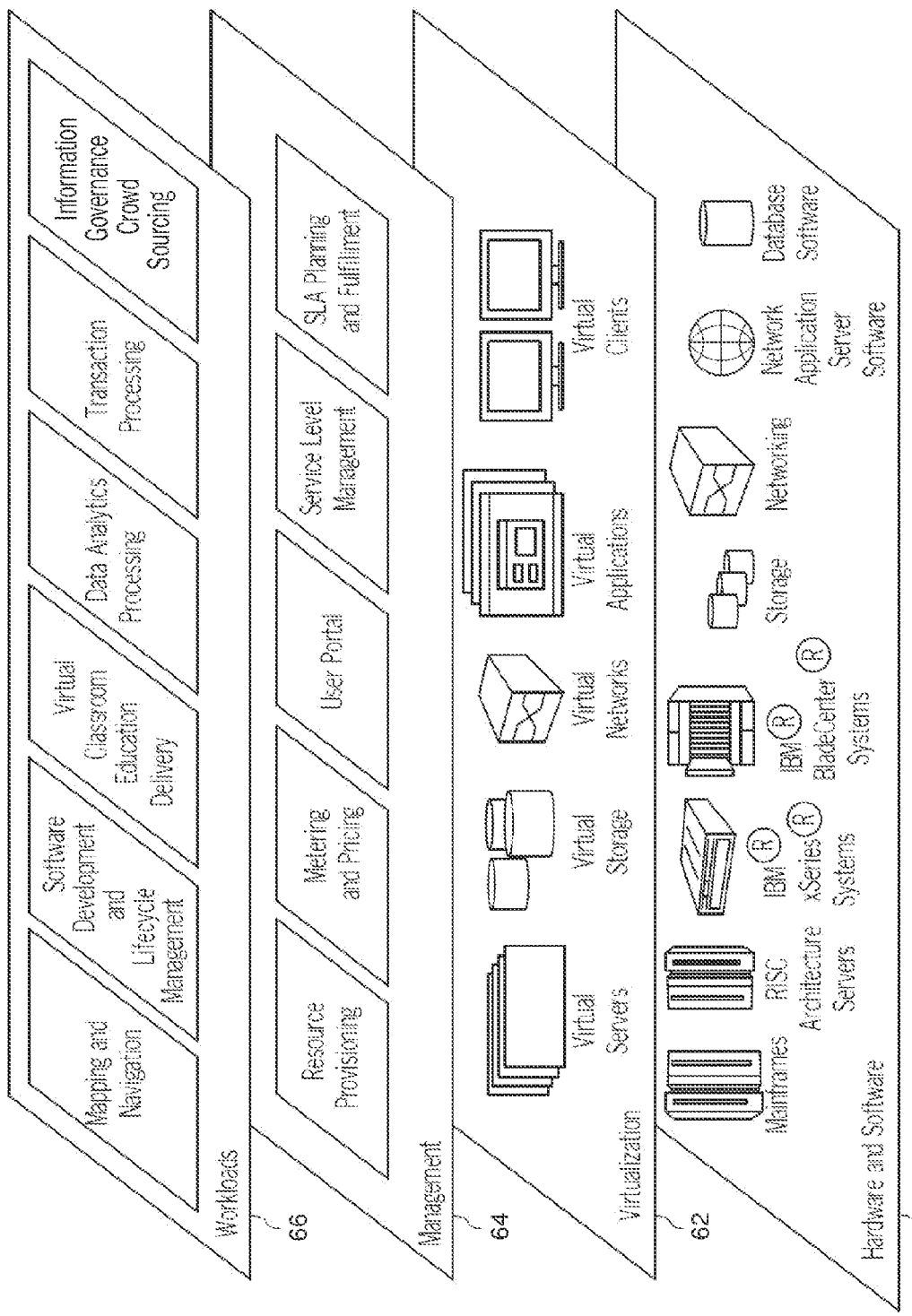
FIG. 5 depicts abstraction model layers according to one embodiment described herein.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide.).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and information governance crowd sourcing.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the invention may be devised without departing from the basic scope thereof, and the scope thereof is determined by the claims that follow.

What is claimed is:

1. A computer-implemented method, comprising:
    responsive to receiving a data quality exception identifying a data quality error of a value of data in a data store, identifying a performance level required to correct the data quality error;
    selecting, from a crowd hierarchy, a first crowd meeting the defined performance level, wherein the crowd hierarchy ranks the performance of each of a plurality of crowds relative to the performance of each of the other crowds, wherein the plurality of crowds includes the first crowd; and
    routing, by operation of one or more computer processors, the data quality error to the selected crowd for correction.

2. The computer-implemented method of claim 1, wherein the performance level is identified based on a type of the data quality exception, wherein the data quality error is based on one or more of: (i) a format of the value, (ii) a correctness of the value, and (iii) a syntax of the value, the method further comprising:
    emitting a data quality exception, comprising:
        defining a data quality standard, wherein the data quality standard comprises at least one of: (i) a format of data values, (ii) a correctness of data values, and (iii) a syntax of data values;
        monitoring the data in the data store; and
        upon detecting the data quality error in the value, emitting the data quality exception, wherein the data quality error is related to a violation of the data quality standard by the value;
    wherein the data quality exception specifies the value having the data quality error and a set of attributes of the data quality error, wherein the attributes comprise at least a type of the data quality error.

3. The computer-implemented method of claim 2, wherein the data quality exception is emitted responsive to one of: (i) receiving user input specifying a data quality error, and (ii) receiving a notification specifying a data quality error.

4. The computer-implemented method of claim 1, wherein identifying the performance level comprises, in respective instances, each of:
    determining a privacy level of a data having the data quality error;
    identifying, based on the privacy level of the data, a crowd platform to correct the data quality error, wherein the crowd platform is one of (i) an internal crowd platform, wherein members of the internal crowd platform are employees of an organization owning the data store, (ii) an external crowd platform, wherein members of the external crowd platform are not employees of the organization owning the data store, and (iii) a partner crowd sourcing platform, wherein members of the partner crowd platform are not employees of the organization owning the data store, wherein the partner crowd platform agrees to security and privacy requirements to fulfill the sensitivity level, wherein the first crowd is part of the identified crowd platform; and
    determining whether work completed by a first crowd must be verified by a second crowd, wherein the second crowd has a higher position in the crowd hierarchy than the first crowd.

5. The computer-implemented method of claim 4, further comprising:
    determining that a service level agreement has been violated by the first crowd;
    upon determining that the violation of the service level agreement comprises the first crowd being unable to correct the error within a defined time period within which the data quality error must be corrected, routing the data quality error to additional crowd members;
    upon determining that the violation of the service level agreement comprises the first crowd being unable to correct the error within the defined time period, routing the data quality error to a second crowd, wherein the second crowd completes tasks more efficiently than the first crowd; and
    responsive to receiving a first data quality correction from the first crowd, upon determining that the violation of the service level agreement comprises a quality of the first correction falling below a specified threshold, routing the data quality error to the third crowd, wherein the third crowd has a performance record greater than the performance record of the first crowd, wherein the performance record is indicative of a level of skill of each crowd.

6. The computer-implemented method of claim 1, further comprising implementing a crowd hierarchy, comprising:
   identifying a plurality of crowds, wherein each of the plurality of crowds comprises a plurality of people, wherein each of the plurality of crowds comprises individuals from the same crowd or different crowds;
   for each of the plurality of crowds:
      assigning scores to each crowd, wherein the scores relate to attributes of the respective crowd, wherein the attributes comprise a level of expertise and a level of productivity of the respective crowd, wherein the scores correspond to the respective crowd as a whole and to each of the plurality of people in the crowd; and
      upon completion of a task by a respective crowd, updating the scores of the respective crowd, wherein the scores are increased for a positive performance, wherein the scores are decreased for an unsatisfactory performance; and
   ranking, based on the scores, each of the plurality of crowds.

7. The computer-implemented method of claim 1, further comprising providing a work cost calculator to compute the cost of correcting the data quality error, wherein computing the cost of correcting the data quality error comprises at least one of:
   prior to routing the data quality error, computing the cost of assigning the data quality error to each of the crowds for correction based on at least one of a number of data quality error, an amount of time required to correct the data quality error, and a skill level required to correct the data quality error;
   subsequent to routing the data quality error to the first crowd, computing the cost of assigning the data quality error to additional crowd members; and
   subsequent to routing the data quality error to the first crowd, computing the cost of assigning the data quality error to a second crowd having a higher position in the crowd hierarchy than the first crowd.

8. The computer-implemented method of claim 1, further comprising computing a wage for the first crowd, comprising:
   computing a base wage for the first crowd, wherein the base wage is based on a position of the first crowd in the crowd hierarchy;
   upon satisfactory completion of the data quality corrections by the first crowd, increasing the respective base wage to a modified wage;
   upon unsatisfactory completion of the data quality corrections by the first crowd, decreasing the respective base wage to a modified wage; and
   returning the respective modified wage as the computed wage for the first crowd.

* * * * *